3,580,859
ACTIVE MATERIAL FOR LASERS
Igor Mikhailovich Buzhinsky, Pervomaiskaya ul. 5, kv. 46, Moskovskaya Obl., Lytkarino, U.S.S.R.; and Mark Efremovich Zhabotinsky, Pogodinskaya ul. 2/3, kv. 53; Jury Petrovich Rudnitsky, Babushkin, Troitsky per. 43, kv. 65; Vadim Vasilievich Tsapkin and Irma Vyacheslavovna Tsapkina, both of Tatarskaya ul. 9-a, kv. 13; and Georgy Vladimirovich Ellert, Ul. Garibaldi 19, korp. 2, kv. 53, all of Moscow, U.S.S.R.
Filed Dec. 20, 1967, Ser. No. 692,179
Int. Cl. C09k 1/04; C03c 3/28
U.S. Cl. 252—301.1                    5 Claims

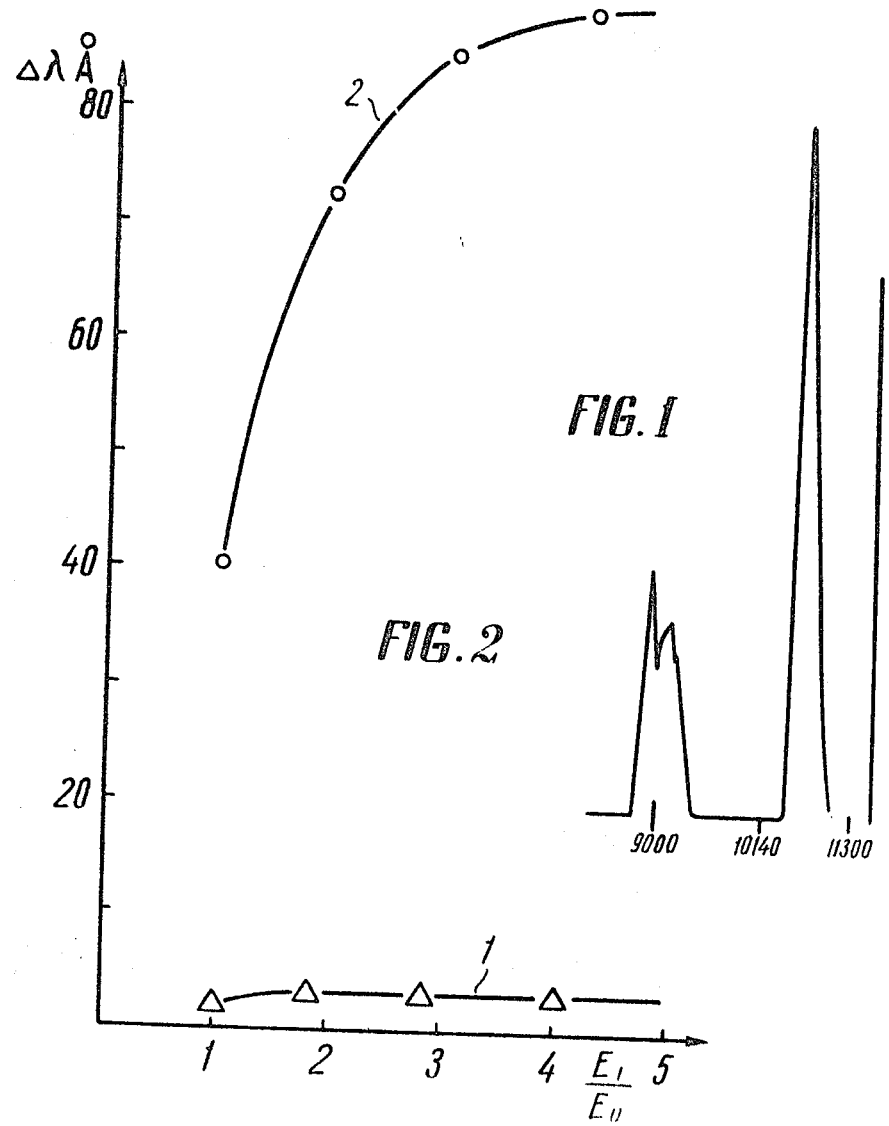

ABSTRACT OF THE DISCLOSURE

Laser glasses consisting of 30–90 wt. percent of $P_2O_5$; 2–40 wt. percent of each of $Na_2O$ and $Li_2O$; 1–6 wt. percent $Nd_2O_3$ and additives of aluminum oxides or halides, halides of tin and ions of Cu, Mn, Cr, U and Ag; the total amount of said additives being not more than 20 wt. percent.

---

The invention relates to quantum electronics and has particular reference of active materials lasers.

There are known active materials based upon silicate and borosilicate glasses and activated by $Nd^{3+}$ and $Yb^{3+}$ ions (cf. Proceedings of the Academy of Sciences of the U.S.S.R., Inorganic materials, vol. III pp. 217–259, 1967).

As is commonly known, lasers in which active silicate glass is employed, enable high energy to be obtained under pulsed operation conditions; however, these materials suffer from a number of disadvantages resulting from the structure of the silicates, their technological perculiarities and the purity of raw material. Thus in the silicate glasses there occurs a non-uniformly broadened energy spectrum of the active ions, this being due to inhomogeneity of the neighboring areas nearest to the active ions as well as to the absence of a sufficient interaction therebetween. This results in a broad generation spectrum and its dependence upon the pumping energy; besides, in cases where selective resonators are employed or monochromatic radiation is amplified, this leads to a degraded output energy and reduced efficiency.

Another disadvantage inherent in the aforementioned glass resides in the fact that the $Fe^{3+}$, $Mn^{2+}$, and some other ions change their valence state when exposed to the effect of light which results in harmful absorption occurring both in pumping bandwidths and in the operating frequency of the laser. Moreover, the presence of spectral absorption in said glass within the zone of 1060 nm. wavelength caused by $Fe^{2+}$ ions, restricts the maximum length of the emitting rods.

To make better use of the pumping light, in the lasers mentioned above, materials are employed, in which their active ions are sensitized or activated. However, $Mn^{2+}$, $Cu^+$ and $Ce^{3+}$ ions so suitable for sensitizing $Nd^{3+}$ and $Er^{3+}$ are of no effect in the case of silicate glass, since the silicate base does not allow the use of luminous radiation with wavelengths shorter than 400 nm. due to the presence of intrinsic absorption and solarization of the glass.

It is an object of the present invention to provide an active material for lasers which is free from the disadvantages mentioned hereinabove and is characterized by generating thresholds lower than those in silicate glass.

It is a specific object of the present invention to select such a composition of the material involved, wherein the constituents of an original stock lend themselves to be purified to a high degree of purification from harmful or deleterious admixtures of Fe and other elements, whereas the properties of the material itself allow Fe that has penetrated therein in the process of synthesis to be maintained in a trivalent state; besides, the quantum structure of the material in question must ensure fast energy exchange between the active ions, as well as low threshold energy values.

Said object is accomplished due to the fact that an active material based upon alkali metals and oxides of rare-earth metals additionally comprises, according to the invention, 30 to 90 weight percent of phosphorus, pentoxide as well as additives of aluminum oxide, halides of aluminum and of tin taken either in combination or separately, and the ions of Cu, Cr, U, or Ag, the total weight percentage of all the additives being not in excess of 20.

The active material involved has the following composition: 2 to 40 wt. percent of litthium oxide, 2 to 40 wt. percent of sodium oxide, 1 to 6 wt. percent of neodymiun oxide, 30 to 90 wt. percent of phosphorous pentoxide, 5 to 10 wt. percent of aluminum fluoride and 0 to 5 wt. percent of aluminum oxide.

Another possible composition of the herein-proposed material provides for the following ingredients: 2 to 40 wt. percent of lithium oxide, 2 to 40 wt. percent of sodium oxide, 1 to 6 wt. percent of neodymium oxide, 30 to 90 wt. percent of phosphorous pentoxide, 5 to 10 wt. percent of aluminum fluoride, 0.05 to 0.5 wt. percent of chromium oxide, or 0.05 to 0.5 wt. percent of silver chloride and 0.05 to 0.5 wt. percent of cuprous chloride.

The herein-disclosed active material in another embodiment thereof consists of 2 to 40 wt. percent of lithium oxide, 2 to 40 wt. percent of sodium oxide, 1 to 6 wt. percent of neodymium oxide, 30 to 90 wt. percent of phosphorus pentoxide, 1 to 5 wt. percent of stannous chloride and 3 to 10 wt. percent of manganous oxide.

In another embodiment of the present invention the active material consists of 2 to 40 wt. percent of lithium oxide, 2 to 40 wt. percent of sodium oxide, 1 to 6 wt. percent of neodymium oxide, 1 to 2 wt. percent of cerous oxide, 30 to 90 wt. percent of phosphorous pentoxide, up to 5 wt. percent of aluminum oxide, 5 to 10 wt. percent of aluminum fluoride and 0.1 to 1.5 wt. percent of uranium trioxide.

The active material constituted in accordance with the present invention possesses the advantage that the predominant covalent character of the O—P—O bonds and low concentrations of multiply charged ions, cause a lower nonuniform broadening of the energy spectrum in the active ions as compared to that in other types of glass and, consequently, lower threshold energy values. Furthermore, as spectroscopic measurements show, pecularities of the quantum structure of the O—P—O bonds in phosphate polymolecules give rise to the most active exchange interaction between the active ions and fast migration of excitation energy therealong, the transfer time being not in excess of $10^{-6}$ sec.

Fast energy exchange not only determines the homogeneity of a spectrum line, but is also conducive of an effective energy transfer from the sensitizer ions to the active ones.

The chemical properties of the active material, according to the invention, are such as will allow a high degree of purification of the original stock from the admixtures of Fe and other impurities. It is the most important feature of the material involved that Fe in the glass be maintained in a trivalent state.

The intrinsic spectral absorption of the herein-proposed active material is found to occur from 250–280 nm. and above, which allows a short-wave range of the injection luminescent pumping to be employed when use is made of $Mn^{2+}$, $Cu^+$, and $UO_2^{2+}$ as sensitizer additives.

An embodiment of the present invention is described hereinbelow by way of example with reference to the accompanying drawings, wherein:

FIG. 1 illustrates the luminescence spectrum of the $Nd^{3+}$ ions in the active material, according to the invention; and FIG. 2 represents characteristic curves of generation spectrum of the laser utilizing the active material of the invention (Curve 1) and a silicate glass (Curve 2), versus pumping energy $E_1$-to-threshold energy $E_0$ ratio.

The active material used in lasers which are capable of emitting light energy of the 1060 nm. wavelength, consist of 8,2 wt. percent of lithium oxide, 17 wt. percent of sodium oxide, 4.0 wt. percent aluminum oxide, 7.7 wt. percent of aluminum fluoride, 60 wt. percent of phosphorus pentoxide, 3.1 wt. percent of neodymium oxide (herein and hereinafter weight percent is implied), its specific weight being 2.52 g./cu.cm and refraction index equalling 1.524.

The active material so constituted can be obtained as follows. An original stock comprising a mixture of finely crushed $LiPO_3$ (39 wt. percent), $NaPO_3$ (46 wt. percent), $AlPO_4$ (7 wt. percent), $AlF_3$ (4.7 wt. percent) and $Nd_2O_3$ (3.3 wt. percent) is melted in a quartz crucible at temperatures from 850 to 1500° C. for 3 to 6 hours and under constant stirring with a quartz agitator. Discharge of finished glass and its annealing are carried out in accordance with conventional technique in the silicate-glass manufacturing art.

Spectral-luminescent characteristics of the active material of the aforementioned composition are as follows: semi-breadth of the luminescent spectrum band (FIG. 1) for 1060 nm. about 16 nm.; lifetime of $Nd^{3+}$ when excited (activated $250 \cdot 10^{-6}$ sec); quantum yield of luminescent energy in the 1060 nm. wavelength under excitation into the 880 nm. wavelength, 0.4± 0.5; inactive absorption within the 1060 nm. wavelength not to exceed $10^{-3}$ cm.$^{-1}$. The generation threshold of a laser employing the herein-proposed active material is substantially lower than in the case of silicate glass. Radiation spectrum of a laser based in phosphate glass is practically independent of the pumping level (Curve 1 in FIG. 2), equally 6 A. in a strip-line resonator and 3 A. in a spherical-cavity resonator.

Described hereinabove is a method of obtaining the active material allowing radiation within the 1060 nm. wavelength for pumping sources with a temperature of about 7000° K.

To make use of the blue and ultra-violet spectrum, as well as to vary the wavelength of a coherent radiation, the ingredients of the active material are to be selected in keeping with the data found in Table 1 below (in weight percent).

TABLE 1

| $Si_2O$ | $Na_2O$ | $P_2O_5$ | $AlF_3$ | $UO_3$ | $AgNO_3$ | $Cr_2O_3$ | $Cu_2O$ | MnO | $Nd_2O_3$ | $Yb_2O_3$ |
|---|---|---|---|---|---|---|---|---|---|---|
| 9.2 | 12.8 | 65 | 10.0 | | | | | | 3 | |
| 10.1 | 10.5 | 52.0 | 10.0 | | | 14.4 | | | 3 | |
| 5.2 | 6.8 | 73.0 | 10.0 | 1.0 | | | | | 4 | |
| 6.7 | 12.5 | 67.6 | 10.0 | | 0.2 | | | | 3 | |
| 4.1 | 6.3 | 56.6 | 10.0 | | | | | 15.0 | 3 | 5 |
| 15.0 | | 71.8 | 10.0 | | | | 0.1 | | 3 | |

The active materials proposed here and hereinabove, as experimental testing both in free-generation and in amplification modes has shown, are capable of a specific energy yield 30 percent higher than that of silicate glass.

What is claimed is:

1. A glass active material for lasers, said active material consisting essentially of 2–40% by weight each of the oxides of lithium and sodium; 1–6% by weight of neodymium oxide; 30 to 90 percent by weight of phosphorus pentoxide; additives of aluminum oxide, halides of aluminum halides of tin and the ions of one of the following elements: Cu, Mn, Cr, U, Ag, the total percent by weight of all the additives being not in excess of 20.

2. A glass active material, for lasers consisting essentially of lithium oxide 2 to 40 wt. percent; sodium oxide 2 to 40 wt. percent; neodymium oxide 1 to 6 wt. percent; phosphorous pentoxide 30 to 90 wt. percent; aluminum fluoride 5 to 10 wt. percent; and aluminum oxide from 0 to 5 wt. percent.

3. A glass active material for lasers consisting essentially of lithium oxide 2 to 40 wt. percent; sodium oxide 2 to 40 wt. percent; neodymium oxide 1 to 6 wt. percent; phosphorous pentoxide 30 to 90 wt. percent; cuprous chloride 0.05 to 0.5 wt. percent and one of the following substances: aluminum fluoride 2 to 7 wt. percent; chromium oxide 0.05 to 0.5 wt. percent; or silver chloride 0.5 to 0.5 wt. percent.

4. A glass active material for lasers consisting essentially of, lithium oxide 2 to 40 wt. percent; sodium oxide 2 to 40 wt. percent; neodymium oxide 1 to 6 wt. percent; phosphorous pentoxide 30 to 90 wt. percent; manganous oxide 3 to 10 wt. percent and stannous chloride 1 to 5 wt. percent.

5. A glass active material for lasers consisting essentially of, lithium oxide 2 to 40 wt. percent; sodium oxide 2 to 40 wt. percent; neodymium 1 to 6 wt. percent; phosphorous pentoxide 30 to 90 wt. percent; aluminum fluoride 2 to 7 wt. percent; aluminum oxide from 0 to 3 wt. percent and uranium trioxide from 0 to 2 wt. percent.

References Cited

UNITED STATES PATENTS

| 3,250,721 | 5/1966 | DePaolis et al. | 252—301.4P |
| 3,449,136 | 6/1969 | Carpentier et al. | 252—301.4P |

TOBIAS E. LEVOW, Primary Examiner

R. D. EDMONDS, Assistant Examiner

U.S. Cl. X.R.

252—301.4